United States Patent [19]

Rainear

[11] 4,332,923

[45] Jun. 1, 1982

[54] COMPOSITION FOR COATING HEAT SENSITIVE SUBSTRATES

[75] Inventor: Dennis H. Rainear, Midland, Mich.

[73] Assignee: Dow Corning Corporation, Midland, Mich.

[21] Appl. No.: 199,391

[22] Filed: Oct. 23, 1980

[51] Int. Cl.³ .................. C08G 59/70; C08G 59/40; C08G 77/46

[52] U.S. Cl. ..................... 525/507; 528/16; 528/26; 528/27

[58] Field of Search ............. 525/507; 528/16, 26, 528/27

[56] References Cited

U.S. PATENT DOCUMENTS

| | | | |
|---|---|---|---|
| 2,645,629 | 7/1953 | Nitzsche | 528/16 |
| 3,431,143 | 3/1969 | Johnson et al. | 117/155 |
| 3,779,988 | 12/1973 | Rembold et al. | 528/27 X |
| 3,843,577 | 10/1974 | Keil | 260/29.1 |
| 3,926,885 | 12/1975 | Keil | 260/29.1 |
| 3,971,747 | 7/1976 | Bank et al. | 260/37 |
| 4,082,719 | 4/1978 | Liles et al. | 528/16 X |

*Primary Examiner*—Earl A. Nielsen
*Attorney, Agent, or Firm*—Robert F. Fleming

[57] ABSTRACT

Low temperature, fast curing compositions suitable for coatings, particularly for paper and other heat sensitive substrates, consist of certain epoxy resins, certain organopolysiloxanes containing silanol groups and contain organo aluminum catalysts. For example, glassine or Kraft paper are coated with a mixture of a cycloaliphatic epoxy resin having an epoxide equivalent weight of 140, a hydroxyl endblocked polydimethylsiloxane having a degree of polymerization of about 10 and aluminum tris(acetylacetonate) and cured in one minute at 135° C.

10 Claims, No Drawings

COMPOSITION FOR COATING HEAT SENSITIVE SUBSTRATES

THE ART

It is known from U.S. Pat. No. 3,971,747 that aluminum catalysts of the type included in this application will cause the reaction and curing of a combination of a silanol containing siloxane and an epoxy resin. However, the specific combination of catalysts, resins and siloxanes is not disclosed in said patent, nor is there anything in this patent to lead one to select the instant compositions. Furthermore, the patent does not suggest the use of the disclosed compositions as coatings for paper or other heat sensitive substrates.

U.S. Pat. No. 3,926,885 discloses oil-in-oil emulsions of polydimethylsiloxanes in epoxy resins. The siloxanes can contain silanol end groups. The oil-in-oil emulsion is obtained by using a surfactant similar to the surfactant used in some of the claims of the instant application. The patent further states in column 3, that the epoxy resin can be cured by using a long list of curing agents including on line 45, aluminum alkoxides. However, the clear teaching of the patent is that the siloxane fluid is there in an emulsified form which permanently lubricates the surface of the epoxy resin after curing. It is obvious that the patent did not contemplate using the siloxane as a crosslinker for the epoxy resin as is illustrated by the fact that the primary thrust of the disclosure is the use of trimethylsilyl endblocked polyorganosiloxanes which, of course, have no silanols. The patent further teaches in column 5, that the compositions can be used for coating paper and the like. However, again, none of the critical limitations set forth in this invention can be found in this patent and no specific material described in the patent anticipates the claimed invention.

U.S. Pat. No. 3,431,143 teaches the use of siloxanes containing, attached to some of the silicon atoms, organic radicals containing epoxy groups which materials can be used to size paper. However, this patent does not show the combination of epoxy resins and hydroxylated siloxanes along with the aluminum catalyst as claimed in this invention.

SUMMARY OF THE INVENTION

This invention relates to a composition, suitable for coating heat sensitive substrates, consisting essentially of a mixture of (1) from 35 to 85 percent by weight of an epoxy resin having an epoxy equivalent weight below 200 and being selected from the group consisting of aliphatic, cycloaliphatic and novolac epoxy resins, (2) from 15 to 65 percent by weight of a silanol containing siloxane of the group siloxanes of the formula $$\begin{array}{c} R \\ | \\ HO(SiO)_xH \\ | \\ CH_3 \end{array}$$

and fluid copolymers of $RSiO_{3/2}$ and $(CH_3)_2SiO$ in which R is a phenyl or methyl radical and x has an average value from 3 to 40 and (3) an aluminum catalyst compatible with (1) and combinations of (1) and (2) of the type aluminum chelates of beta-dicarbonyl compounds of the group diketones, ketoesters and diesters, and aluminum alkoxides, (3) being in amount sufficient to cure the combination of (1) and (2) within three minutes at 150° C. or less.

DETAILED DESCRIPTION OF THE INVENTION

Epoxy resins have excellent properties but in general require too long cure times at the relatively low temperatures required on heat sensitive substrates such as paper and thermoplastic films. Siloxanes have long been used on paper and other substrates as release coatings, water repellents and lubricants, but they suffer from the disadvantage of poor oil, alkali and grease resistance and poor mechanical properties.

It is a primary object of this invention to provide a low temperature curing coating material for use on paper and thermoplastic films or other heat sensitive substrates which combine the desirable properties of epoxy resins and siloxanes and thereby advance the art of coating such substrates. The advance comprises the fact that such heat sensitive substrates can now be coated with a new coating material combining the desirable properties of gloss, chemical resistance, adhesion and release.

The epoxy resins which are operative in this invention are aliphatic epoxy resins such as 1,4-butanediol diglycidyl ether, neopentyl glycol diglycidyl ether, diglycidyl ether of propyleneglycol, butylglycidyl ether and decyldiglycidyl ether; cycloaliphatic epoxies such as vinyl cyclohexene dioxide, 3,4-epoxy-6-methyl-cyclohexylmethyl-3,4-epoxy-6-methylcyclohexane carboxylate, 3,4-epoxycyclohexylmethyl-3,4-epoxycyclohexane carboxylate, epoxycyclohexylspiroepoxycyclohexane dioxide and bis(3,4-epoxy-6-methylcyclohexylmethyl) adipate; and epoxy novolacs which are polyepoxides derived from low molecule weight phenol- or substituted phenol-aldehyde polymers in which the phenolic hydroxyls have been converted into epoxy ethers. These latter types have the general structure

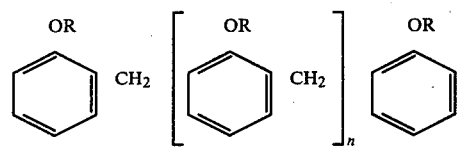

where R carries an epoxy group, for example

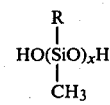

such as polyglycidyl ethers of phenyl formaldehyde novolacs and polyglycidyl ethers of orthocresol formaldehyde novolac. These resins have a high degree of functionality and therefore cure rapidly.

Further examples of cycloaliphatic epoxy resins are set forth in U.S. Pat. No. 3,779,988 and further examples of novolac epoxy resins are found in U.S. Pat. No. 3,284,398, both of which are hereby incorporated by reference.

Suitable aluminum catalysts are those compatible with the epoxy resin and a combination of (1) and (2). These include aluminum alkoxides of the formula $Al(OR)_3$ in which R is an alkyl or haloalkyl radical such as isopropyl, hexyl, heptyl, secondary butyl, etc. and aluminum chelates of the formula

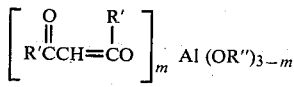

in which R' is an alkyl or haloalkyl radical such as methyl, trifluoromethyl, ethyl etc. or an R'O— radical such as ethoxy and m is an integer from 1 to 3. R" can be an alkyl radical the same as R or an acyl radical such as acetate, propionate or stearate, palmetate, oleate and trichloroacetate. These chelates are prepared by reacting aluminum alkoxides with beta-dicarbonyl compounds such as acetyl acetone, ethyl acetoacetic ester and diethyl malonate. During the reaction from 1 to 2 alkoxy groups are replaced by the beta-dicarbonyl compound. The examples of the latter are aluminum diisopropoxy acetoacetic ester chelate, aluminum isopropoxide stearate acetoacetic ester chelate, and aluminum disecondarybutoxide acetoacetic ester chelate.

The mixture of (1), (2) and the catalyst can be applied to the substrate in any convenient fashion. For example, it can be applied in the form of a solvent solution or an aqueous emulsion or an oil-in-oil emulsion or neat; that is, where the mixture (1) and (2) is a compatible liquid.

The catalyzed combination of (1) and (2) has a shelf stability ranging from a few minutes to several days or longer. The solvent solutions and aqueous emulsions have the longest storage life and have shown at least a year shelf life. After this time they are still curable to effective coatings. Any suitable solvent can be used for the solutions but specific operative examples are methylisobutyl ketone, toluene, xylene or alcohols. The aqueous emulsions can be prepared by any convenient method using any known surfactants. However, the preferred surfactants are non-ionic materials such as the higher aliphatic derivatives of polyalkylene oxides or alkylated phenols.

A particularly desirable form is the oil-in-oil emulsion in which the organosilicon compound is dispersed in the epoxy resin. These oil-in-oil emulsions can be made by any convenient method but the best method known to applicant is the use of the surfactants shown in U.S. Pat. Nos. 3,926,885 and 3,843,577, the disclosure of both of which is incorporated herein by reference. It can be seen that these surfactants are of three types (A) copolymers of polydimethylsiloxanes in which the polydimethylsiloxane portion has a molecular weight of at least 1500 and the organic portion consists essentially of polyoxyethylene polymer, polyoxypropylene polymer or a polyoxyethylene-polyoxypropylene copolymer, said organic portion having a molecular weight of at least 500 and being attached to the silicon either through an SiC or an SiOC linkage, (B) copolymers of a siloxane consisting essentially of $SiO_2$ units $(CH_3)_3SiO_{1/2}$ units and $Q(CH_3)_2SiO_{1/2}$ units in which Q is attached to the silicon through an SiC bond and is a polyoxypropylene polymer, a polyoxyethylene polymer or a polyoxypropylene-polyoxyethylene copolymer having a molecular weight of at least 500, the ratio of $SiO_2$ units to the total $(CH_3)_3SiO_{1/2}$ and $Q(CH_3)_2SiO_{1/2}$ units being in the range from 1:0.4 to 1:1.2 and (C) copolymers which are the reaction products derived from heating a mixture of a siloxane copolymer consisting essentially of $SiO_2$ units and $(CH_3)_3SiO_{1/2}$ units in which the ratio of $SiO_2$ units to $(CH_3)_3SiO_{1/2}$ units is in the range of 1:0.4 to 1:1.2 and a hydroxylated polyoxypropylene polymer, a hydroxylated polyoxyethylene polymer, or a hydroxylated copolymer of polyoxypropylene, polyoxyethylene, said oxyalkylenes having a molecular weight of at least 500. The above surfactants can be employed in amount from 1 to 10 percent by weight based on the weight of the silicone and epoxy resin. They are particularly needed to incorporate methylsiloxanes having a degree of polymerization of 10 or above into the epoxy resin.

The amount of (1) and (2) ranges from 35 to 85 percent by weight epoxy resin to 15 to 65 percent by weight siloxane based on the combined weights of the two. The best proportion for a given coating will depend in part upon the functionality of the siloxane. In general, the amount of siloxane employed should give an SiOH to epoxy group ratio of from 1:15 to 1:3. However, with very low molecular weight dimethylsiloxanes, i.e. those having an SiOH equivalent weight of 180 or less, the ratio can be as low as 1:1.2. It should be understood that the above are the preferred ranges to give the best coatings.

The amount of catalyst used varies with the particular (1) and (2) combination and the particular catalyst. Any amount which cures the combination of (1) and (2) in 3 minutes at 150° C. or less is included. An example of an operative range is from 0.1 to 5 percent based on the weight of (1) and (2).

The term "heat sensitive substrate" means those substrates which must be coated at temperatures of 150° C. or below because of decomposition, embrittlement or shrinkage. Examples of such substrates are paper, leather, organic fabrics or thermoplastic films particularly those which are subject to heat shrinkage.

Although the compositions of this invention are particularly designed for use on heat sensitive substrates they can also be used on other substrates such as metal, glass and thermoset resins.

Based on the properties obtained from the coatings, the commercial utility of these materials is indicated for food, chemical and industrial packaging applications which would permit contact with sticky products and for application to plastic films which are normally difficult to coat because of poor wetting properties. This would be particularly important on heat sensitive thermoplastics such as polyethylene, polypropylene, and polyester films. The coatings also can be used on cartons which require good scuff and water resistance particularly soap cartons which require alkali resistance as well as water resistance. Other uses include release barrier coatings on extruded boards for use in direct oven cooking, for premium paper plates, for snack food packaging, and for varnishes for reusable cases such as beer cases.

The examples given below are for the purpose of illustration only and the scope of the invention is delineated in the appended claims. All parts and percents are by weight unless otherwise specified. It will be readily understood by those of ordinary skill in the silicone technology that the demonstration in the examples of 3,4-epoxycyclohexylmethyl-3,4-epoxycyclohexanecarboxylate and an epoxy novolac resin having a viscosity of 1400 to 2000 centipoise at 25° C. and an epoxy equivalent weight of 172 to 179, teaches the usefulness of all other aliphatic, cycloaliphatic and novolac epoxy resins having an epoxy equivalent weight below 200.

It will also be apparent to those skilled in silicone technology that the use of aluminum triacetylacetonate and the aluminum alkoxide shown in the examples makes it apparent to one of ordinary skill in the silicone technology that all other aluminum catalysts claimed in this invention would also operate.

Based on the data in Table I, the coatings are rated on the following scale. A—excellent, commercially acceptable; B—good, commercially marginal; C—below commercial performance. The results of this rating are shown below.

with (2) a polyvinylidene chloride latex. The coating weights and test results are shown in Table I below.

TABLE I

| Description | Coating Wt. Kg per 278.7 m² | Gloss %[1] 75° | Abrasion[2] Resistance mg/100 Revolutions | Oil[3] Resistance | Water[4] Resistance | Acid[4] Resistance | Alkali[4] Resistance |
|---|---|---|---|---|---|---|---|
| Glassine | 0 | 57 | — | 6 | 21.0 | 30 | 44 |
| (1) | 0.453 | 87 | 79 | 90+ | 5.8 | 11 | 15 |
| (2) | 0.453 | 63 | 49 | 28 | 20.0 | 27 | 43 |
| (1) | 0.906 | 92 | 130 | 90+ | 1.0 | 0.9 | 1.8 |
| (2) | 0.906 | 70 | 19 | 37 | 7.2 | 13.0 | 37.0 |
| Kraft | 0 | 35 | — | 5 | 41 | 42 | 66 |
| (1) | 0.453 | 61 | 71 | 55 | 25 | 13 | 30 |
| (2) | 0.453 | 35 | 33 | 34 | 35 | 29 | 61 |
| (1) | 0.906 | 66 | 120 | 90+ | 15 | 0.9 | 2.3 |
| (2) | 0.906 | 32 | 11 | 40 | 30 | 19 | 45 |

The tests were those of the U.S. Trade Association of Pulp and Paper Industry (TAPPI) as follows:
[1]T480 Os-78
[2]T476 pm-76
[3]T454 Os-77
[4]T441 Os-77

The oil-in-oil surfactant hereinafter called OIO employed in some of the examples was made in accordance with U.S. Pat. No. 3,483,577 by reacting 14.8 parts of a hydroxylated siloxane resin composed of $SiO_2$ units and $(CH_3)_3SiO_{1/2}$ units in the ratio of about 1:0.4 to 1:1.2 and 22.3 parts of a hydroxylated copolymer of 73 weight percent ethylene oxide and 25 weight percent propylene oxide having a viscosity of 90,000 cps. The product was used in the examples in the form of a 33 percent by weight solution in xylene. In the copolymer the glycol was tied to the organosiloxane through a silicon-oxygen-carbon bond.

EXAMPLE 1

A formulation was made by mixing in percent by weight (1) 56.6 percent of 3,4-epoxycyclohexylmethyl-3,4-epoxycyclohexane carboxylate, 37.74 percent of the fluid

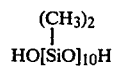

and 5.66 percent of OIO. To this mixture was added 5 parts per 100 parts (1) of a 10 percent by weight solution of aluminum triacetylacetonate

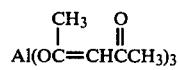

in 20 percent ethanol and 70 percent toluene. This gives 0.5 percent by weight aluminum catalyst based on the weight of (1).

The catalyzed mixture was coated onto both 30 lb. glassine paper and 40 lb. super calendered Kraft paper and cured at 135° C. for 60 seconds. The weights of the coatings (1) were converted to Kg per ream, i.e. per 278.7 m². For comparison each paper was also coated

| Coating | Gloss Glassine | Gloss Kraft | Abrasion Resistance | Liquid Water Barrier | Acid Resistance | Alkali Resistance | Oil Resistance |
|---|---|---|---|---|---|---|---|
| (1) | A | B | B | A | A | A | A |
| (2) | B | C | A | B | B | B | B |

At neither level of coating was (1) or (2) acceptable as a water vapor or oxygen barrier.

EXAMPLE 2

The epoxy resin of Example 1 was mixed with a hydroxyl endblocked polydimethylsiloxane fluid having a degree of polymerization of about 40 units, in the amounts shown below and in each case there was added 5 percent by weight OIO and 0.1 percent aluminum triacetylacetonate both based on the combined weights of epoxy resin and siloxane. The material was coated on paper and cured at 120° C. for the times shown below. Those samples which cured had a glossy finish.

TABLE II

| Epoxy % by Wt. | Siloxane % by Wt. | $CH_2\overset{O}{\overset{/\backslash}{CH}}$—/SiOH Ratio | Observations After 120° C. Cure |
|---|---|---|---|
| 90 | 10 | 91:1 | no cure, 3 min. |
| 80 | 20 | 43:1 | no cure, 3 min. |
| 70 | 30 | 25:1 | tacky, 3 min. |
| 60 | 40 | 16.5:1 | cured, 45 sec. |
| 50 | 50 | 10:1 | cured, 45 sec. |
| 40 | 60 | 7:1 | cured, 40 sec. |

The epoxy equivalent weight of the resin is 140 and the SiOH equivalent weight of the siloxane is 1489.

EXAMPLE 3

The epoxy resin used in this example was a polyglycidyl ether of a phenol formaldehyde novolac having an epoxy equivalent weight of 172 to 179. The siloxane used was a hydroxyl endblocked polyphenylmethylsiloxane having a degree of polymerization of about 5 (SiOH equivalent weight 349). The two were mixed in the amount shown below in percent by weight and each mixture was catalyzed with 0.1 percent by weight of aluminum triacetyl acetonate, coated on paper and cured at 122° C. for the times shown.

TABLE III

| % Epoxy | % Siloxane | Cure Time | Result |
|---------|------------|-----------|--------|
| 80 | 20 | 45 sec. | tough, glossy coating |
| 70 | 30 | 50 sec. | tough, glossy coating |
| 40 | 60 | 45 sec. | did not cure |

EXAMPLE 4

This example shows the use of a solvent solution and no OIO. 3 parts by weight of the siloxane of Example 1 and 7 parts by weight of the epoxy resin of that example were dissolved in 90 g. of methylisobutylketone and catalyzed with 0.1 percent by weight of aluminum triacetylacetonate based on the weight of the siloxane and epoxy resin. The solution was applied using a No. 5 Mayer rod to super calendered Kraft paper. The coating was cured one minute at 121° C. to give a void free coating which exhibited no rub off and no smear.

EXAMPLE 5

150 g. of a methoxylated copolymer of monophenylsiloxane and dimethylsiloxane containing per mole of silicon, 0.54 mole phenyl, 1 mole methyl and 0.82 mole methoxy groups was charged into a three necked flask and stirred as 20 g of water containing 3 drops of acetic acid was added. The stirred mixture was heated to reflux (65° C.) for 4 hours to remove methanol. The resulting cloudy fluid was allowed to cool, centrifuged and dried over a molecular sieve.

2 parts by weight of the above silanol containing fluid was mixed with 3.5 parts by weight of the epoxy resin of Example 1 and a trace of aluminum triacetylacetonate. The formulation was coated on paper and found to cure 100° C. in 5 seconds to give a good coating.

EXAMPLE 6

This example shows the use of a different catalyst which is an aluminum alkoxide having the structure approximately

The catalyst was dissolved in xylene to give a 10 percent solution. One gram of this solution was added to 9 g of the formulation (1) of Example 1 to give 1 percent catalyst on the solids basis. The mixture was applied to paper and cured in 15 seconds at 107° C. to give a glossy coating with little migration. The catalyst was also used at 0.03 percent by weight and was found to cure the product in 45 sec. at 150° C.

EXAMPLE 7

The epoxy resin of Example 1 was mixed in various proportions with the fluid

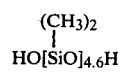

and 0.1 percent on a solids basis of the catalyst of Example 1. Each formulation was coated on Kraft paper using a blade coater and cured 20 sec. at 150° C. to give smooth coatings. The formulations were:

| % By Weight Epoxy | % By Weight Siloxane Fluid | $CH_2CH-\overset{O}{\overset{\diagup\diagdown}{{}}}/SiOH$ |
|---|---|---|
| 50 | 50 | 1.28 |
| 67 | 33 | 2.60 |
| 80 | 20 | 5.14 |

EXAMPLE 8

A series of runs was made with various mixtures of the epoxy resin, the siloxane fluid and the aluminum catalyst of Example 1. In each case, 0.5 percent by weight of the catalyst of Example 1 was used and each was heated at 150° C. for 3 minutes to check for cure. No OIO was used.

| Wt. Epoxy in g. | Wt. Siloxane in g. | % Siloxane | State of Cure |
|---|---|---|---|
| 4.5 | 0.5 | 10 | incomplete |
| 3.5 | 1.5 | 30 | good |
| 2.5 | 2.5 | 50 | good |
| 2.0 | 3.0 | 60 | fair |
| 1.0 | 4.0 | 80 | incomplete |

EXAMPLE 9

This example shows the use of an emulsion.

The siloxane fluid of Example 1 was emulsified by mixing (I) 35 percent by weight siloxane fluid, 1.5 percent octylphenoxypolyether ethanol*, HLB 14.6, 2.9% octylphenoxypolyether ethanol*, HLB 17.9 and 60.6% water. A second emulsion was made containing (II) 35% of the epoxy resin of Example 1 containing 0.42 percent by weight of the aluminum catalyst of that example and using identical amounts of the two emulsifiers and water of emulsion (I). Each emulsion was made by dissolving the HLB 17.9 emulsifier in 10.6 parts of water and adding with stirring the mixture of the fluid or resin and the HLB 14.6 emulsifier. Each emulsion was stirred for several hours and then passed through a colloid mill with a gap setting for 5 mils (0.025 mm) and slowly diluted with water to bring the concentration of fluid or resin to 35 percent. Emulsions (I) and (II) were combined in various proportions shown below by mixing or shaking and the mixed emulsion was coated on paper with a drawn down bar and cured at 135° C. for 45 sec. to give excellent coatings.
*Made by reacting octylphenol with ethylene oxide.

| % By Wt. I | % By Wt. II |
|---|---|
| 50 | 50 |
| 40 | 60 |
| 30 | 70 |

The combined emulsions showed excellent stability over a period of at least 6 days.

EXAMPLE 10

50 g of the epoxy resin of Example 1 and 50 g of the siloxane fluid of that example were dissolved in 60 g of a 50% by weight mixture of butanol and heptane. To the solution was added 0.2% by weight, based on the combined weights of epoxy resin and siloxane, of Al tris hexafluoro acetylacetonate

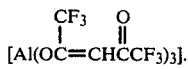

The solution was applied to a substrate, air dried for 10 minutes and then cured at 150° C. for less than 2 minutes to give a non-tacky coating.

That which is claimed is:

1. A composition suitable for coating heat sensitive substrates consisting essentially of a mixture of (1) from 35 to 85 percent by weight of an epoxy resin having an epoxy equivalent weight below 200 and being selected from the group aliphatic, cycloaliphatic and novolac epoxy resins, (2) from 15 to 65 percent by weight of a silanol containing siloxane of the group siloxanes of the formula

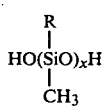

and fluid copolymers of $RSiO_{3/2}$ and $(CH_3)_2SiO$ in which R is phenyl or methyl and x has an average value from 3 to 40 and (3) an aluminum catalyst compatible with (1) and combinations of (1) and (2) of the type aluminum chelates of beta-dicarbonyl compounds of the group diketones, ketoesters and diesters and aluminum alkoxides, (3) being in amount sufficient to cure the combination of (1) and (2) within three minutes at 150° C. or less.

2. The composition of claim 1 which also contains a dispersing agent for (1) and (2) in amount of from 1 to 10 percent by weight based on the weight of (1) and (2), said dispersing agent being of the group consisting of (A) copolymers of polydimethylsiloxanes having a molecular weight of at least 1500 and polyoxyalkylene polymers of the group polyoxypropylene, polyoxyethylene and copolymers of polyoxyethylene and polyoxypropylene said oxyalkylenes having molecular weights of at least 500, the siloxane and the polyoxyalkylenes being joined either through an SiC or an SiOC linkage, (B) copolymers of $SiO_2$ units, $(CH_3)_3SiO_{1/2}$ units and $Q(CH_3)_2SiO_{1/2}$ units in which Q is a polyoxypropylene, a polyoxyethylene or a copolymer of polyoxypropylene-polyoxyethylene radical having a molecular weight of at least 500, the ratio $SiO_2$ units to the total $(CH_3)_3SiO_{1/2}$ and $Q(CH_3)_2SiO$ units being in the range 1:0.4 to 1:1.2, Q being connected to the Si through SiC bonds, and (C) copolymers which are reaction products derived from heating a mixture of a siloxane copolymer consisting essentially of $SiO_2$ units and $(CH_3)_3SiO_{1/2}$ units in which the ratio of $SiO_2$ units and $(CH_3)_3SiO_{1/2}$ units is in the range 1:0.4 to 1:1.2 and a hydroxylated polyoxypropylene, hydroxylated polyoxyethylene or hydroxylated polyoxyethylene-polyoxypropylene copolymers, said polyoxyalkylenes having a molecular weight of at least 500.

3. A composition in accordance with claim 2 in which R is methyl, (1) is a cycloaliphatic epoxy resin and the dispersing agent is (C).

4. A composition of claim 1 in which (1) is a cycloaliphatic epoxy resin.

5. A composition in accordance with claim 1 in which R is phenyl and (1) is a novolac epoxy resin.

6. A method of coating a heat sensitive substrate which comprises applying thereto a composition of claim 1 and curing within 3 minutes at a temperature of 150° C. or less.

7. A method of coating a heat sensitive substrate which comprises applying thereto the compositions of claims 2 or 3 and thereafter curing within 3 minutes at 150° C. or less.

8. A method of coating a heat sensitive substrate which comprises applying thereto the compositions of claims 4 or 5 and curing within 3 minutes at a temperature of 150° C. of less.

9. A heat sensitive substrate coated with the cured composition of claims 1, 4 or 5.

10. A heat sensitive substrate coated with the cured composition of claims 2 or 3.

* * * * *

UNITED STATES PATENT AND TRADEMARK OFFICE
CERTIFICATE OF CORRECTION

PATENT NO. : 4,332,923
DATED : June 1, 1982
INVENTOR(S) : Dennis H. Rainear

It is certified that error appears in the above—identified patent and that said Letters Patent is hereby corrected as shown below:

In Column 10; line 7, the line reading "$(CH_3)_3SiO_{\frac{1}{2}}$ and $Q(CH_3)_2SiO$ units being in the range" should read "$(CH_3)_3SiO_{\frac{1}{2}}$ and $Q(CH_3)_2SiO_{\frac{1}{2}}$ units being in the range"

Signed and Sealed this

Sixteenth Day of November 1982

[SEAL]

Attest:

GERALD J MOSSINGHOFF

*Attesting Officer*     *Commissioner of Patents and Trademarks*